United States Patent
Doi et al.

(10) Patent No.: US 7,076,212 B1
(45) Date of Patent: Jul. 11, 2006

(54) RADIO RECEIVING SYSTEM AND SYNCHRONIZATION DETECTION METHOD

(75) Inventors: Yoshiharu Doi, Gifu (JP); Takeo Miyata, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 251 days.

(21) Appl. No.: 10/111,414

(22) PCT Filed: Oct. 25, 2000

(86) PCT No.: PCT/JP00/07487

§ 371 (c)(1),
(2), (4) Date: May 6, 2002

(87) PCT Pub. No.: WO01/35590

PCT Pub. Date: May 17, 2001

(30) Foreign Application Priority Data

Nov. 8, 1999 (JP) ............................................ 11-316861

(51) Int. Cl.
*H04B 1/00* (2006.01)
*H04B 15/00* (2006.01)

(52) U.S. Cl. ...................... 455/63.1; 455/510; 455/501; 455/67.13; 455/101; 455/135; 375/148; 375/149; 375/150; 375/342; 375/354; 375/367; 370/335; 370/342; 370/350

(58) Field of Classification Search ................ 455/63.1, 455/526, 501, 67.13, 570, 562.1, 575.7, 101, 455/135; 375/150, 149, 142, 342, 130, 148, 375/354, 367; 370/342, 350, 335
See application file for complete search history.

(56) References Cited

U.S. PATENT DOCUMENTS

| | | | | |
|---|---|---|---|---|
| 5,812,593 A | * | 9/1998 | Kaku | 375/150 |
| 5,995,571 A | * | 11/1999 | Inuzuka | 375/367 |
| 6,014,570 A | * | 1/2000 | Wong et al. | 455/500 |
| 6,104,748 A | * | 8/2000 | Kaku | 375/235 |
| 6,137,843 A | * | 10/2000 | Chennakeshu et al. | 375/340 |
| 6,154,487 A | * | 11/2000 | Murai et al. | 375/150 |
| 6,335,954 B1 | * | 1/2002 | Bottomley et al. | 375/354 |
| 6,549,527 B1 | * | 4/2003 | Tsutsui et al. | 370/342 |

FOREIGN PATENT DOCUMENTS

| | | |
|---|---|---|
| EP | 0 896 441 A2 | 2/1999 |
| JP | 3-70221 | 3/1991 |
| JP | 7-154129 | 6/1995 |
| JP | 11-239086 | 8/1999 |

* cited by examiner

*Primary Examiner*—Marceau Milord
(74) *Attorney, Agent, or Firm*—Westerman, Hattori, Daniels & Adrian, LLP

(57) ABSTRACT

A weight vector of a precedent frame calculated by a weight vector calculator (4) and stored in a memory (3) is applied to a signal received through a plurality of antennas ($ANT_1$, ... $ANT_n$) for removing an interference wave component. A synchronous position is detected from the signal subjected to removal of the interference wave component by a method of correlation synchronization, and supplied to the weight vector calculator (4). The weight vector calculator (4) executes calculation of a weight vector with the detected synchronous position as a start position. Thus, when signals of the same frequency are received in a CS in an overlapping manner, the synchronous position of a signal received from a desired PS can be correctly specified.

8 Claims, 12 Drawing Sheets

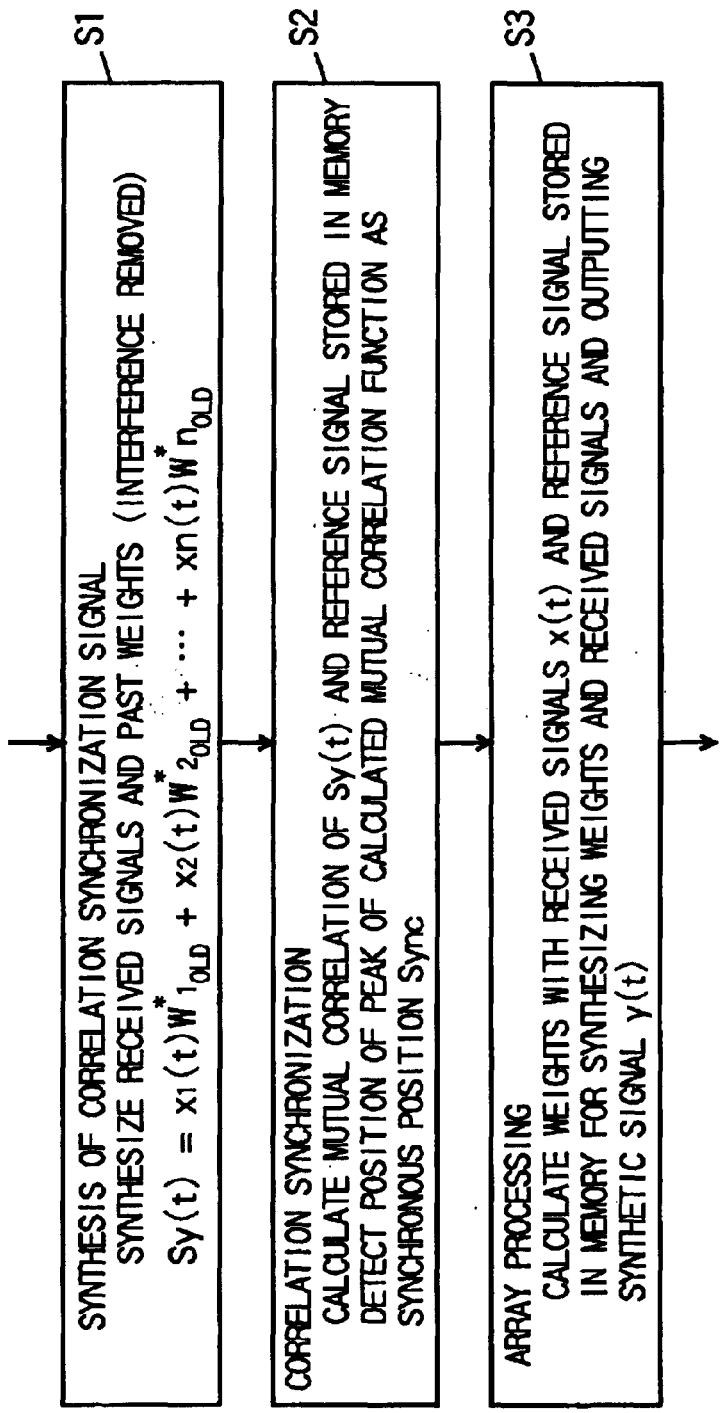

FIG. 3

S1: SYNTHESIS OF CORRELATION SYNCHRONIZATION SIGNAL
SYNTHESIZE RECEIVED SIGNALS AND PAST WEIGHTS (INTERFERENCE REMOVED)
$Sy(t) = x_1(t)W_{1_{OLD}}^* + x_2(t)W_{2_{OLD}}^* + \cdots + x_n(t)W_{n_{OLD}}^*$ S2: CORRELATION SYNCHRONIZATION
CALCULATE MUTUAL CORRELATION OF $Sy(t)$ AND REFERENCE SIGNAL STORED IN MEMORY
DETECT POSITION OF PEAK OF CALCULATED MUTUAL CORRELATION FUNCTION AS SYNCHRONOUS POSITION Sync S3: ARRAY PROCESSING
CALCULATE WEIGHTS WITH RECEIVED SIGNALS $x(t)$ AND REFERENCE SIGNAL STORED IN MEMORY FOR SYNTHESIZING WEIGHTS AND RECEIVED SIGNALS AND OUTPUTTING SYNTHETIC SIGNAL $y(t)$

RADIO RECEIVING SYSTEM AND SYNCHRONIZATION DETECTION METHOD

TECHNICAL FIELD

The present invention relates to a radio receiving system and a synchronization detection method, and more particularly, it relates to a radio receiving system and a synchronization detection method capable of detecting a synchronous position of a signal received from a mobile terminal unit through correlation synchronization in a base station of a mobile communication system.

BACKGROUND TECHNIQUE

In a mobile communication system such as a portable telephone set (for example, Personal Handyphone System: hereinafter abbreviated as PHS) rapidly developing in recent years, synchronization detection according to the so-called correlation synchronization is generally known as a method of finding out a synchronous position of a signal received from a mobile terminal unit (Personal Station: hereinafter abbreviated as PS) in a base station (Cell Station: hereinafter abbreviated as CS).

Generally known synchronous position detection according to correlation synchronization is now schematically described.

When a CS generally receives a signal from a PS in time division multiplexing, the CS cannot demodulate the received signal to data unless specifying a position where an information part of the signal starts (start symbol in a PHS: hereinafter abbreviated as SS) on an absolute time axis excluding an initial unnecessary component. This operation of specifying the start position of the information (specifying the time position of the SS in the PHS) is generally referred to as detection of a synchronous position.

The idea of correlation synchronization described below is widely employed as such a method of detecting the synchronous position. In consideration of that the signal received from the PS includes a known reference signal common to all users, a known waveform of this reference signal is stored in a memory according to this method. A combination of a preamble and a unique word is employed as the reference signal in the PHS, for example, and the preamble is formed by a bit string of repetition of "1001" while the unique word is formed by a prescribed bit string varying with transmission from the PS side and transmission from the CS side.

The waveform of the received signal of a constant length is sliced with displacement, for calculating correlation between the same and the waveform of the reference signal stored in the memory. A time position where the calculated correlation value peaks is specified as the synchronous position.

The process of this specification of the synchronous position is described with reference to a waveform diagram of FIG. 11. Referring to FIG. 11, (a) shows the waveform of the known reference signal stored in the memory of the CS. On the other hand, (b) in FIG. 11 shows the waveform of the signal continuously received in the CS from the PS.

When signal components are sliced from the received signal (b) with displacement by a time length equal to the time length of the reference signal (a) and the sliced waveform is compared with the waveform of the reference signal, the correlation value of these signals increases (1.0 when completely matching) if the waveforms match with each other while the correlation value lowers if the waveforms mismatch with each other. Referring to FIG. 11, (c) shows a correlation function consisting of such a correlation value of the reference signal (a) and the received signal (b).

In the example shown in FIG. 11, the waveform of the received signal (b) on the time axis matches with the fixed waveform of the reference signal (a) in sections specified by broken lines ① and ②. Therefore, it follows that the correlation value of the waveforms peaks on a time position (shown by a broken line ③) implementing such matching of the waveforms, while the correlation value lowers (approaches zero) in other time positions.

Thus, it is possible to specify the synchronous position on the time axis by continuously calculating the correlation value of the fixed waveform stored in the memory of the CS and the partial waveform of the received signal and finding out the peak value thereof. The above is the basic idea of conventional correlation synchronization.

The aforementioned description of correlation synchronization is premised on that a signal from a single PS is independently received in the CS. However, the CS may receive signals of the same frequency from two PSs in an overlapping manner.

In path division multiple access (hereinafter abbreviated as PDMA) spatially dividing a single time slot of the same frequency and allocating channels to a plurality of PSs, for example, two signals of the same frequency may arrive at the CS in an overlapping manner.

Regardless of such a PDMA system, further, the CS may receive a radio wave from another PS connected with a CS in another cell as an unnecessary interference radio wave in a state overlapping with a signal of the same frequency from a desired PS.

In this case, the synchronous position of the signal from the desired PS cannot be specified by the aforementioned method of correlation synchronization. FIG. 12 is a waveform diagram for illustrating such a state that the synchronous position is hard to specify.

Referring to FIG. 12, each of (a) to (c) is a graph showing change (correlation function) of the correlation value between the fixed waveform ((a) in FIG. 11) and received waveforms in the case where two signals of the same frequency are received in the CS in an overlapping manner.

When two signals of the same frequency are received in an overlapping manner, two peak values may appear on the correlation value as shown in FIG. 12(a), to disable identification of the signal received from the desired PS.

As shown at (b) in FIG. 12, only a single peak value may appear between two synchronous positions where two peak values must originally appear, in place of the two peak values.

When the two received signals are remarkably different in signal power from each other, the synchronous position of the signal having weaker power may be overlooked as shown at (c) in FIG. 12.

As hereinabove described, the conventional method of correlation synchronization has such a problem that the synchronous position of the desired PS cannot be specified when the CS receives two signals of the same frequency in an overlapping manner.

Accordingly, an object of the present invention is to provide a radio receiving system and a synchronization detection method capable of detecting the synchronous position of a signal received from a desired PS and correctly extracting the received signal by a method of correlation synchronization even when a CS receives signals of the same frequency in an overlapping manner.

DISCLOSURE OF THE INVENTION

The present invention provides a radio receiving system receiving a signal from a mobile terminal unit with a plurality of antennas, comprising first interference removal means provisionally removing an interference signal component from the received signal, correlation synchronization detection means detecting correlation synchronization of the received signal subjected to removal of the interference signal component by the first interference removal means, and second interference removal means removing an interference signal component from the received signal with the synchronous position detected by the correlation synchronization detection means as a start position.

According to another aspect of the present invention, a radio receiving system receiving a signal from a mobile terminal unit with a plurality of antennas comprises weight vector calculation means calculating a weight vector corresponding to a desired mobile terminal unit every frame of the received signal, storage means storing the calculated weight vector, first signal extraction means applying the weight vector of a precedent frame stored in the storage means to a frame of a newly received signal and extracting a signal from the desired mobile terminal unit, correlation function calculation means calculating a correlation function of the extracted signal and a prescribed reference signal, synchronous position detection means detecting a time position where the correlation function peaks as a synchronous position, and second signal extraction means applying the weight vector of the frame of the newly received signal calculated by the weight vector calculation means to the frame of the newly received signal for extracting and outputting the signal from the desired mobile terminal unit, while the weight vector calculation means calculates the weight vector of the frame of the newly received signal with the detected synchronous position as a start position.

According to still another aspect of the present invention, a radio receiving system receiving a signal from a mobile terminal unit with a plurality of antennas comprises weight vector calculation means calculating a weight vector corresponding to a desired mobile terminal unit every frame of the received signal, first storage means storing the calculated weight vector, mode set means setting a synchronization capture mode or a synchronization protection mode, first signal extraction means applying said weight vector of a precedent frame stored in the first storage means to a frame of a newly received signal and extracting a signal from the desired mobile terminal unit in the synchronization capture mode, correlation function calculation means calculating a correlation function of the signal extracted by the first signal extraction means and a prescribed reference signal in the synchronization capture mode, synchronous position detection means detecting a time position where the correlation function peaks as a synchronous position in the synchronization capture mode, second storage means storing the detected synchronous position, second signal extraction means applying the weight vector of the frame of the newly received signal calculated by the weight vector calculation means to the frame of the newly received signal for extracting and outputting the signal from the desired mobile terminal unit, and error determination means determining whether or not the signal extracted by the second signal extraction means has a receiving error, while the weight vector calculation means calculates the weight vector of the frame of the newly received signal with the synchronous position detected by the synchronous position detection means as a start position in the synchronization capture mode or with the synchronous position stored in the second storage means as a start position in the synchronization protection mode, and the mode set means sets the synchronization protection mode when the error determination means determines that there is no error in the synchronization capture mode while maintaining the synchronization capture mode when the error determination means determines that there is an error in the synchronization capture mode and sets the synchronization capture mode when the error determination means continuously determines that there is an error in excess of a prescribed number of times in the synchronization protection mode while maintaining the synchronization protection mode when the prescribed number of times is not reached in the synchronization protection mode.

According to a further aspect of the present invention, a radio receiving system receiving a signal from a mobile terminal unit with a plurality of antennas comprises weight vector calculation means calculating a weight vector corresponding to a desired mobile terminal unit every frame of the received signal, first storage means storing the calculated weight vector, mode set means setting a synchronization capture mode or a synchronization protection mode, first signal extraction means applying a weight vector of a precedent frame stored in the first storage means in the synchronization capture mode or the weight vector of the frame of the newly received signal calculated by the weight vector calculation means in the synchronization protection mode to the frame of the newly received signal and extracting a signal from the desired mobile terminal unit, correlation function calculation means calculating a correlation function of the signal extracted by the first signal extraction means and a prescribed reference signal, synchronous position detection means detecting a time position where the correlation function peaks as a synchronous position, second storage means storing the detected synchronous position, second signal extraction means applying the weight vector of the frame of the newly received signal calculated by the weight vector calculation means to the frame of the newly received signal for extracting and outputting the signal from the desired mobile terminal unit, and error determination means determining whether or not the signal extracted by the second signal extraction means has a receiving error, while the weight vector calculation means calculates the weight vector of the frame of the newly received signal with the synchronous position detected by the synchronous position detection means as a start position in the synchronization capture mode or with the synchronous position stored in the second storage means as a start position in the synchronization protection mode, and the mode set means sets the synchronization protection mode when the error determination means determines that there is no error in the synchronization capture mode while maintaining the synchronization capture mode when the error determination means determines that there is an error in the synchronization capture mode and sets the synchronization capture mode when the error determination means continuously determines that there is an error in excess of a prescribed number of times in the synchronization protection mode while maintaining the synchronization protection mode when the prescribed number of times is not reached in the synchronization protection mode, and the radio receiving system further comprises means comparing the synchronous position detected by the synchronous position detection means with the synchronous position stored in the second storage means in the synchronization protection mode for updating the synchronous position stored in the second storage means when the difference between the synchronous positions exceeds a prescribed magnitude.

According to a further aspect of the present invention, a synchronization detection method in a radio receiving system receiving a signal from a mobile terminal unit with a plurality of antennas comprises steps of provisionally removing an interference signal component from the received signal, detecting correlation synchronization of the received signal subjected to removal of the interference signal component, and removing an interference signal component from the received signal with the synchronous position detected by the correlation synchronization detection as a start position.

According to a further aspect of the present invention, a synchronization detection method in a radio receiving system receiving a signal from a mobile terminal unit with a plurality of antennas comprises steps of calculating a weight vector corresponding to a desired mobile terminal unit every frame of the received signal, storing the calculated weight vector, applying the stored weight vector of a precedent frame to a frame of the newly received signal and extracting a signal from the desired mobile terminal unit, calculating a correlation function of the extracted signal and a prescribed reference signal, detecting a time position where the correlation function peaks as a synchronous position, and applying the calculated weight vector of the frame of the newly received signal to the frame of the newly received signal for extracting and outputting the signal from the desired mobile terminal unit, while the step of calculating the weight vector performs calculation of the weight vector of the frame of the newly received signal with the detected synchronous position as a start position.

According to a further aspect of the present invention, a synchronization detection method in a radio receiving system receiving a signal from a mobile terminal unit with a plurality of antennas comprises steps of calculating a weight vector corresponding to a desired mobile terminal unit every frame of the received signal, storing the calculated weight vector, setting a synchronization capture mode or a synchronization protection mode, applying the stored weight vector of a precedent frame to a frame of the newly received signal and extracting a signal from the desired mobile terminal unit in the synchronization capture mode, calculating a correlation function of the extracted signal and a prescribed reference signal in the synchronization capture mode, detecting a time position where the correlation function peaks as a synchronous position in the synchronization capture mode, storing the detected synchronous position, applying the calculated weight vector of the frame of the newly received signal to the frame of the newly received signal for extracting and outputting the signal from the desired mobile terminal unit, and determining whether or not the extracted signal has a receiving error, while the step of calculating the weight vector performs calculation of the weight vector of the frame of the newly received signal with the detected synchronous position as a start position in the synchronization capture mode or with the stored synchronous position as a start position in the synchronization protection mode, and the step of setting the mode sets the synchronization protection mode when it is determined that there is no error in the synchronization capture mode while maintaining in the synchronization capture mode when it is determined that there is an error in the synchronization capture mode and sets the synchronization capture mode when it is continuously determined that there is an error in excess of a prescribed number of times in the synchronization protection mode while maintaining the synchronization protection mode when the prescribed number of times is not reached in the synchronization protection mode.

According to a further aspect of the present invention, a synchronization detection method in a radio receiving system receiving a signal from a mobile terminal unit with a plurality of antennas comprises steps of calculating a weight vector corresponding to a desired mobile terminal unit every frame of the received signal, storing the calculated weight vector, setting a synchronization capture mode or a synchronization protection mode, applying the stored weight vector of a precedent frame in the synchronization capture mode or the calculated weight vector of the frame of the newly received signal in the synchronization protection mode to the frame of the newly received signal and extracting a signal from the desired mobile terminal unit, calculating a correlation function of the extracted signal and a prescribed reference signal, detecting a time position where the correlation function peaks as a synchronous position, storing the detected synchronous position, applying the calculated weight vector of the frame of the newly received signal to the frame of the newly received signal for extracting and outputting the signal from the desired mobile terminal unit, and determining whether or not the extracted signal has a receiving error, while the step of calculating the weight vector performs calculation of the weight vector of the frame of the newly received signal with the detected synchronous position as a start position in the synchronization capture mode or with the stored synchronous position as a start position in the synchronization protection mode, and the step of setting the mode sets the synchronization protection mode when it is determined that there is no error in the synchronization capture mode while maintaining the synchronization capture mode when it is determined that there is an error in the synchronization capture mode and sets the synchronization capture mode when it is continuously determined that there is an error in excess of a prescribed number of times in the synchronization protection mode while maintaining the synchronization protection mode when the prescribed number of times is reached in the synchronization protection mode, and the synchronization detection method further comprises a step of comparing the detected synchronous position with the stored synchronous position in the synchronization protection mode for updating the stored synchronous position when the difference between the synchronous positions exceeds a prescribed magnitude.

BRIEF DESCRIPTION OF THE DRAWINGS

FIG. 3 is a flow chart showing processing of the DSP executing the operations of the functional block diagram shown in FIG. 2 by software.

BEST MODES FOR CARRYING OUT THE INVENTION

The present invention suppresses an interference wave component with an adaptive array in a receiver of a CS thereby extracting a signal received from a desired PS and obtaining a correlation value with reference to a reference signal stored in a memory.

Figure 1:
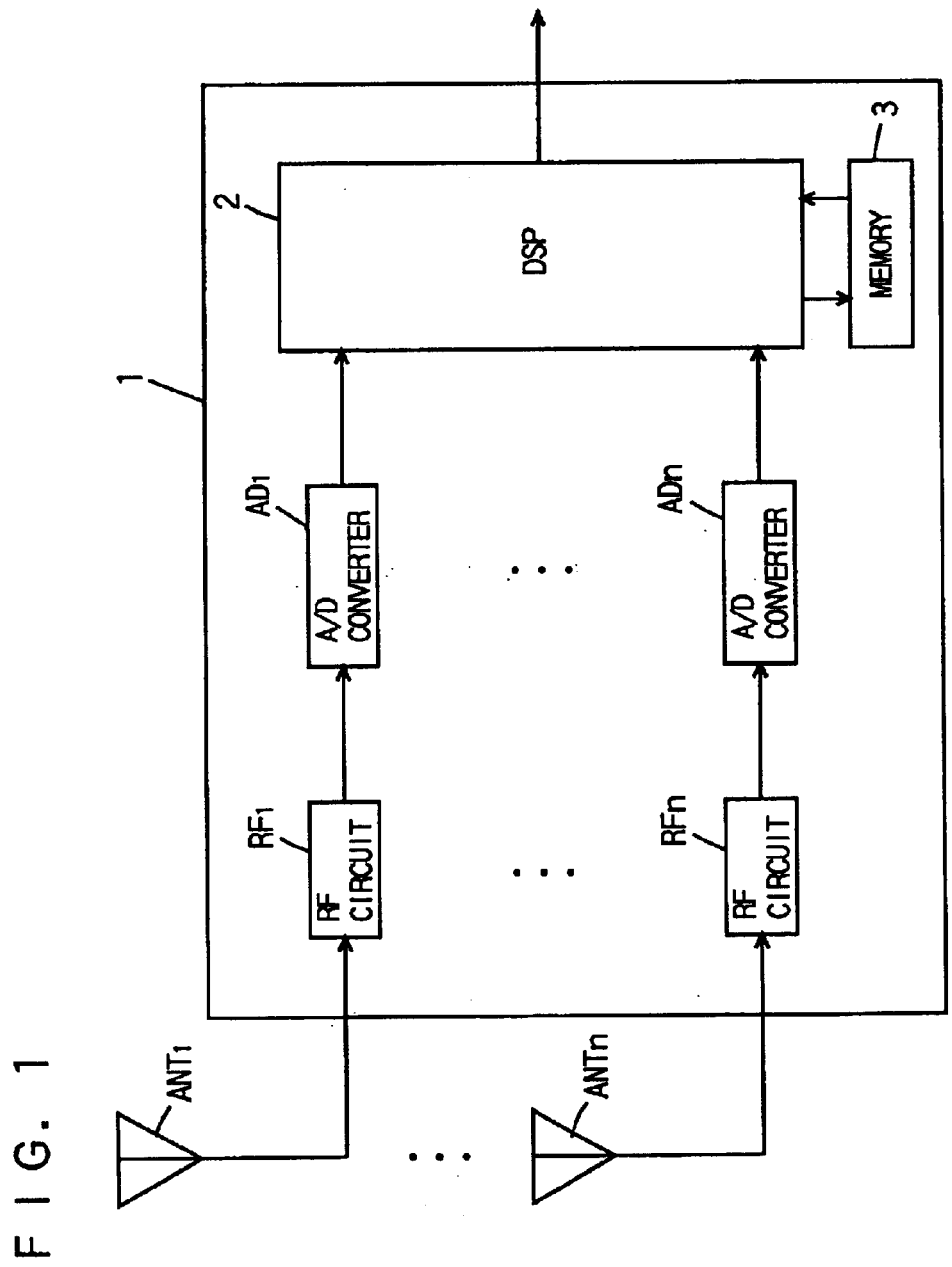
FIG. 1 is a block diagram schematically showing the hardware structure of a receiver of a CS according to the present invention.

FIG. 1 is a block diagram schematically showing the hardware structure of the receiver of the CS according to the present invention.

Referring to FIG. 1, signals received at n antennas $ANT_1, \ldots, ANT_n$ are supplied to the receiver 1 of the CS, subjected to amplification, frequency conversion and cutting of unnecessary frequency components in corresponding RF circuits $RF_1, \ldots, RF_n$, and thereafter converted to digital signals in corresponding A/D converters $AD_1, \ldots, AD_n$.

Outputs of the A/D converters $AD_1, \ldots, AD_n$ are supplied to a digital signal processor (hereinafter abbreviated as DSP) 2, which implements each of first to third embodiments described later. The DSP 2 finally outputs a signal from a desired PS in such a state that synchronization is established and an interference wave component is removed.

A memory 3 is connected to the DSP 2, to hold various data necessary for processing of the DSP 2 in each embodiment described later.

The output signal from the DSP 2 is supplied to an external device as an output signal from the receiver 1 of the CS.

The respective embodiments of the present invention executed by the hardware structure (particularly the DSP 2) shown in FIG. 1 are now described in detail.

[First Embodiment]

Figure 2:
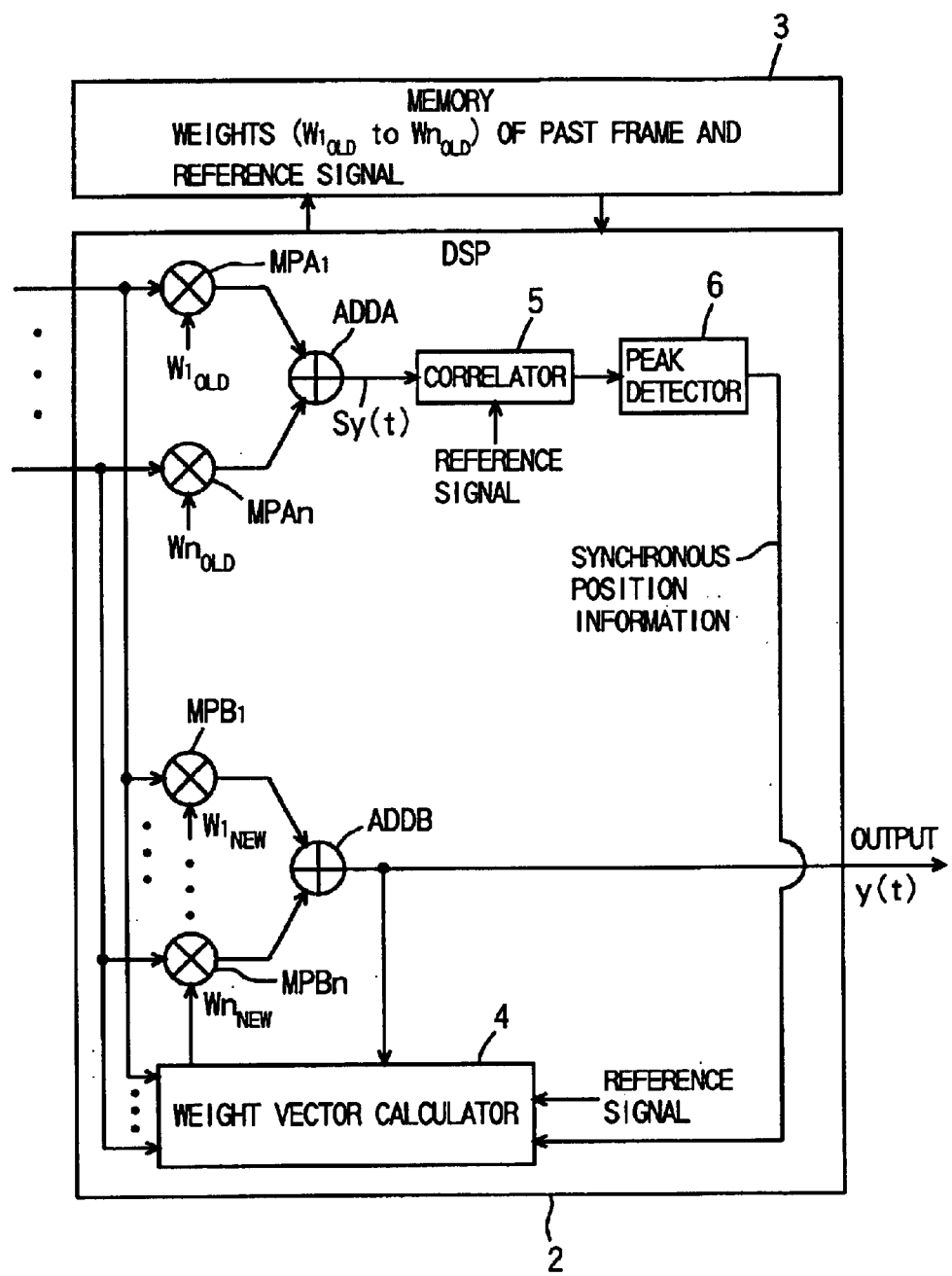
FIG. 2 is a functional block diagram for functionally illustrating processing of a DSP according to a first embodiment of the present invention.

FIG. 2 is a functional block diagram for functionally illustrating processing of a DSP 2 according to a first embodiment of the present invention. This block diagram expresses the DSP 2 as a combination of various circuit elements for illustrating the principle of operations implemented by the DSP 2, which executes processing along a flow chart shown in FIG. 3 in a software manner in practice.

The operation principle of the first embodiment of the present invention is described with reference to FIG. 2.

Digital signals from the A/D converters $AD_1, \ldots, AD_n$ shown in FIG. 1 are supplied to first inputs of multipliers $MPA_1, \ldots, MPA_n$ forming a first adaptive array (signal extraction means or interference removal means) as well as to first inputs of multipliers $MPB_1, \ldots, MPB_n$ forming a second adaptive array respectively.

A weight vector calculator 4 also receives the signals from the A/D converters $AD_1, \ldots, AD_n$, and calculates a weight vector thereof. The basic idea of calculation of the weight vector is now described.

Assuming that A(t) and B(t) represent signals from users A and B respectively, a signal $x1(t)$ received at the first antenna $ANT_1$ shown in FIG. 1 is expressed as follows:

$$x1(t)=a1 \times A(t)+b1 \times B(t)$$

where a1 and b1 represent coefficients changing in real time.

A signal $x2(t)$ received at the second antenna $ANT_2$ is expressed as follows:

$$x2(t)=a2 \times A(t)+b2 \times B(t)$$

where a2 and b2 also represent coefficients changing in real time.

Similarly, a signal xn(t) received at the n-th antenna $ANT_n$ is expressed as follows:

$$xn(t)=an \times a(t)+bn \times B(t)$$

where an and bn also represent coefficients changing in real time.

The above coefficients a1, a2, . . . , an express that the antennas $ANT_1, ANT_2, \ldots, ANT_n$ differ from each other in receiving strength with respect to the signal radio wave from the user A, and the coefficients b1, b2, . . . , $b_n$ express that the antennas $ANT_1, ANT_2, \ldots, ANT_n$ differ from each other in receiving strength with respect to the signal radio wave from the user B. Each user is moving, and hence these coefficient change in real time.

The signals $x1(t)$, $x2(t)$, . . . , xn(t) received at the respective antennas are supplied to the first inputs of the multipliers $MPB_1$, $MPB_2$, . . . , $MPB_n$ forming the second adaptive array, and a weight vector $w_1$, $w_2$, . . . , $w_n$ consisting of weights for the signals received at the respective antennas calculated by the weight vector calculator 4 in real time is applied to second inputs of these multipliers.

Therefore, the multiplier $MPB_1$ outputs $w_1 \times (a1A(t)+b1B(t))$, the multiplier $MPB_2$ outputs $w_2 \times (a2A(t)+b2B(t))$, and the multiplier $MPB_n$ outputs $w_n \times (anA(t)+bnB(t))$.

An adder ADDB adds up the outputs of these $MPB_1$, $MPB_2$, . . . , $MPB_n$, to output:

$$w_1(a1A(t)+b1B(t))+w2(a2A(t)+b2B(t))+ \ldots +w_n(anA(t)+bnB(t))$$

This output is divided into terms related to the signal A(t) and terms related to the signal B(t) as follows:

$$(w1a1+w_2a2+ \ldots +w_nan)A(t)+(w_1b1+w_2b2+ \ldots +w_nbn)B(t)$$

The weight vector calculator 4 calculates the above weights $w_1$, $w_2$, . . . , $w_n$ to be capable of identifying the users A and B and extracting only the signal from the PS of the desired user. For example, the weight vector calculator 4 regards the coefficients a1, a2, . . . , an and b1, b2, . . . , bn as constants and calculates the weights $w_1$, $w_2$, . . . , $w_n$ so that the coefficients of the signal A(t) are 1 as a whole and the coefficients of the signal B(t) are 0 as a whole, in order to extract only the signal A(t) from the PS of the desired user A.

Setting the weights $w_1$, $w_2$, . . . , $w_n$ in this manner, the adder ADDB outputs the following output signal:

$$\text{Output Signal}=1 \times A(t)+0 \times B(t)=A(t)$$

This output signal is fed back to the weight vector calculator 4, for updating the weight vector values with reference to a reference signal stored in a memory 3.

The weight vector $w_1, w_2, \ldots, w_n$ of the frame of the received signals newly calculated by the weight vector calculator 4 in the aforementioned manner is expressed as $W_{1NEW}, W_{2NEW}, \ldots, W_{nNEW}$.

The weight vector newly calculated by the weight vector calculator 4 is supplied to the multiplies $MPB_1, MPB_2, \ldots, MPB_n$ of the second adaptive array as described above, and stored in the memory 3. The weight vector $w_1, w_2, \ldots, w_n$ of precedent frame stored in the memory 3 is expressed as $W_{1OLD}, W_{2OLD}, \ldots, W_{nOLD}$, to be distinguished from the aforementioned just calculated weight vector.

The signals received at the antennas $ANT_1, ANT_2, \ldots, ANT_n$ are input to the first inputs of the multiplies $MPA_1, MPA_2, \ldots, MPA_n$ forming the first adaptive array respectively, and the weight vector $W_{1OLD}, W_{2OLD}, \ldots, W_{nOLD}$ of the precedent frame stored in the memory 3 is input to second inputs of these multipliers.

It is the basic principle of the present invention to apply the weight vector $W_{1OLD}, W_{2OLD}, \ldots, W_{nOLD}$ of the precedent frame stored in the memory 3 to a frame of newly received signals in the first adaptive array when two signal radio waves of the same frequency arrive at the CS in an overlapping manner, thereby removing the component of the undesired signal radio wave for the time being for extracting the signal received from the desired PS (synchronization preprocessing) and detecting the synchronous position with the idea of correlation synchronization on the extracted signal.

This principle is based on such prediction that the directions of arrival of the signal radio waves from the PSs of the users may not abruptly change in a single frame period of 5 milliseconds, noting that the undesired signal component (interference wave component) can be sufficiently removed also when applying the weight vector of the precedent frame to the newly received signals.

Thus, an adder ADDA forming the first adaptive array synthesizes a signal Sy(t) for correlation synchronization subjected to removal of the interference component from the PS of the undesired user, and supplies the same to a correlator 5.

Figure 11:
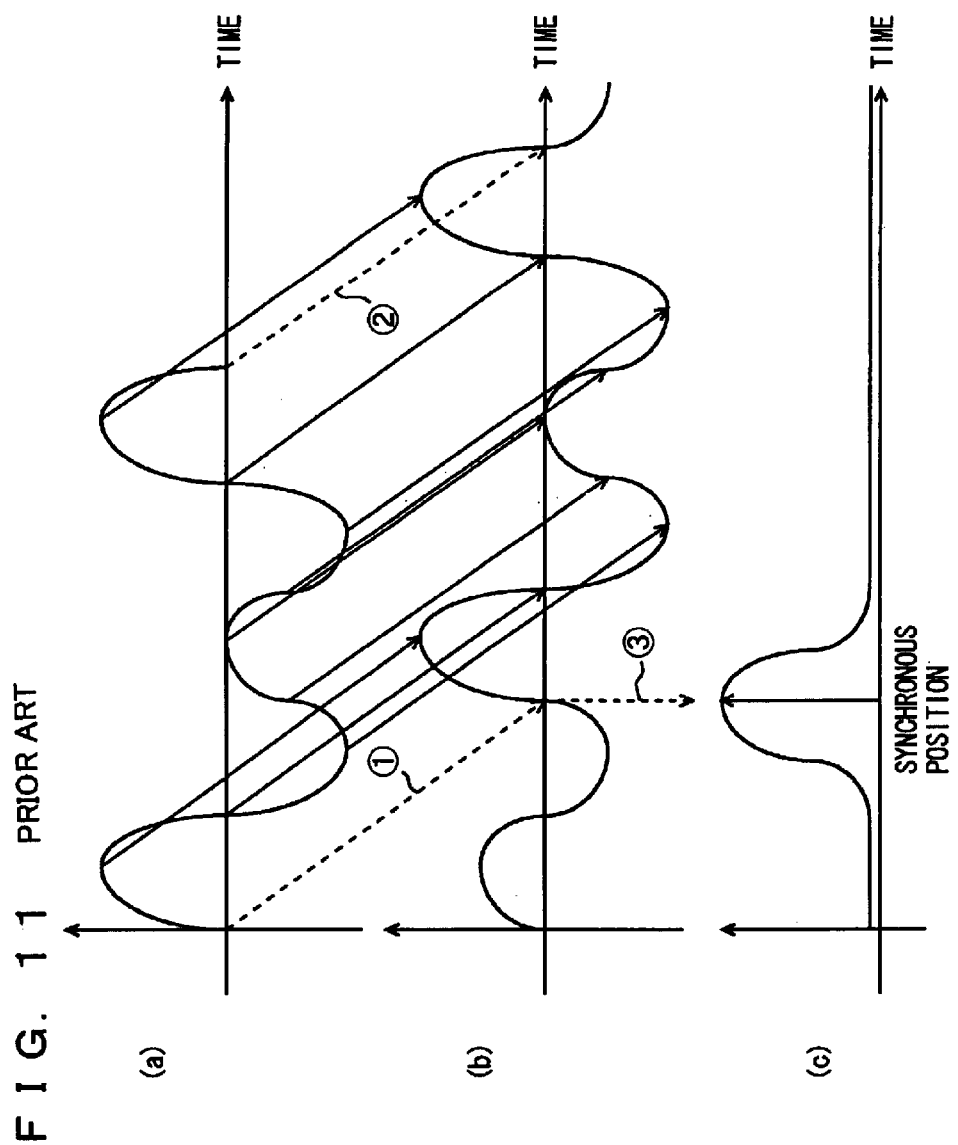
FIG. 11 is a waveform diagram for illustrating the process of detection of a synchronous position by a conventional method of correlation synchronization.

The correlator 5 calculates the correlation function of the signal Sy(t) subjected to removal of the interference wave and the reference signal (preamble+unique word) stored in the memory 3 as described above with reference to FIG. 11, and supplies the correlation function to a peak detector 6.

The peak detector 6 detects a time position where the correlation function calculated in the correlator 5 peaks as a synchronous position Sync, and supplies this synchronous position information to the weight vector calculator 4. The weight vector calculator 4 regards the synchronous position Sync detected by the peak detector 6 as a start position (SS) of the frame of the received signal and starts calculating the weight vector $W_{1NEW}, W_{2NEW}, \ldots, W_{nNEW}$.

The second adaptive array synthesizes the weight vector $w_{1NEW}, W_2NEW, \ldots, W_{nNEW}$ calculated in this manner with the frame of the received signal, so that the signal y(t) from the desired PS can be extracted in higher precision.

FIG. 3 is a flow chart showing processing of the DSP 2 executing the operations of the functional block diagram shown in FIG. 2 by software.

At a step S1, the multiplies $MPA_1, MPA_2, \ldots, MPA_n$ of the aforementioned first adaptive array multiply the received signals $x1(t), x2(t), \ldots, xn(t)$ by the weight vector $W_{1OLD}, W_{2OLD}, \ldots, W_{nOLD}$ calculated in the precedent frame and stored in the memory 3, so that the adder ADDA synthesizes the total sum as the correlation synchronization signal Sy(t) (in the equation of the step S1, symbol * represents a conjugate complex number).

At a step S2, the aforementioned correlator 5 calculates the correlation function of the correlation synchronization signal Sy(t) and the reference signal stored in the memory 3, so that the peak position thereof is detected as the synchronous position Sync by an operation corresponding to that of the aforementioned peak detector 6.

At a step S3, the weight vector $W_{1NEW}, W_{2NEW}, \ldots, W_{nNEW}$ is calculated by an operation corresponding to that of the aforementioned weight vector calculator 4 with the received signals x(t) and the reference signal stored in the memory 3, so that the received signals $x1(t), x2(t), \ldots, xn(t)$ are multiplied by the calculated weight vector $W_{1NEW}, W_{2NEW}, \ldots, W_{nNEW}$ by an operation corresponding to that of the aforementioned second adaptive array. The synthesized total sum is output as the signal y(t) from the desired PS.

Figure 12:
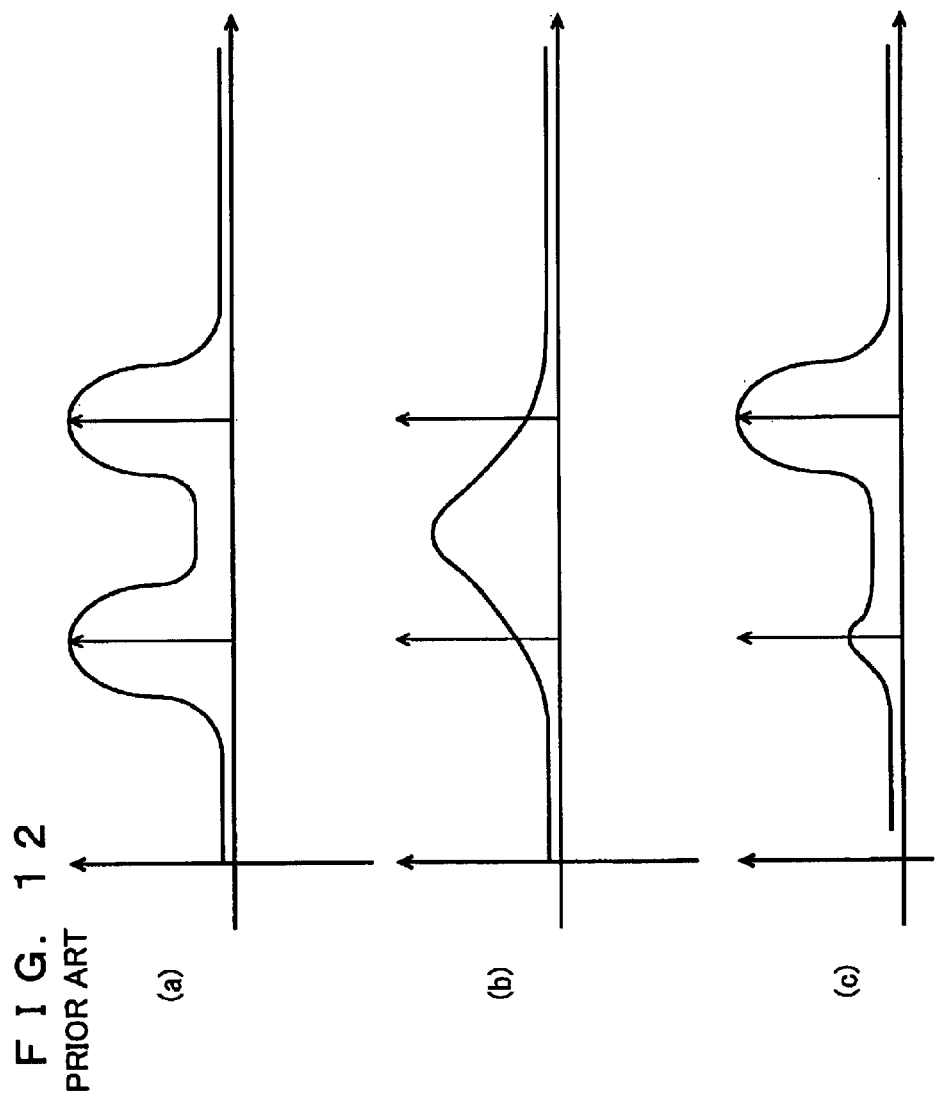
FIG. 12 is a waveform diagram showing such states that it is difficult to specify synchronous positions in the conventional synchronization detection method by correlation synchronization.

In the first frame of the received signal, weight vector is not yet calculated and hence weight vector calculation is performed by provisionally setting either one (for example, the higher peak) of the two peaks shown at (a) in FIG. 12 as the synchronous position, for continuing the operations of the aforementioned steps S1 to S3 if there are no receiving errors. When performing space multiplexing in the PDMA system, the start position (SS) of the precedently connected PS is known and hence the processing may be started by setting the other peak position as the start position (SS) of the signal from the PS requiring connection.

[Second Embodiment]

Figure 4:
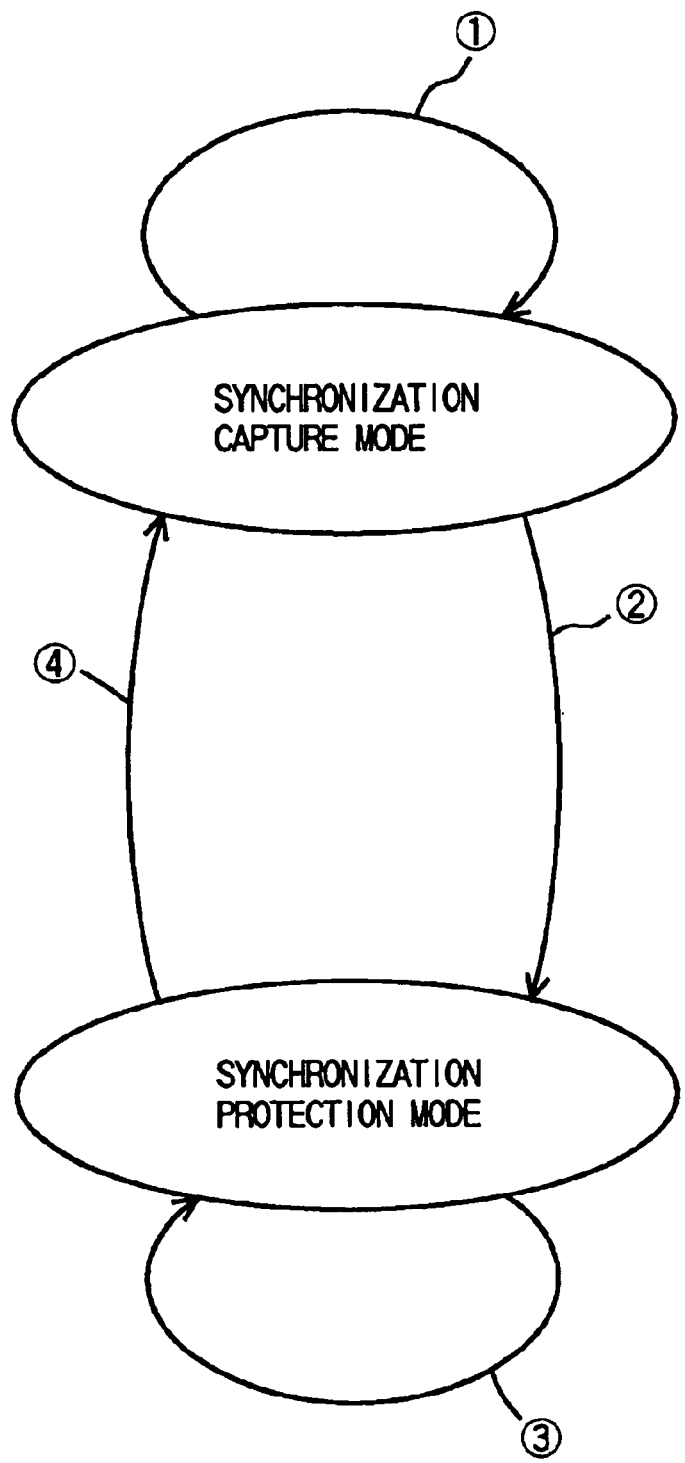
FIG. 4 is a schematic diagram for conceptually illustrating transition of a mode according to the present invention.

FIG. 4 is a schematic diagram for conceptually illustrating transition of modes in a second embodiment of the present invention described below and a third embodiment described later.

In each of these embodiments, an operation mode for establishing synchronization by detecting a synchronous position, not yet detected, of a received signal by the method of correlation synchronization is referred to as a "synchronization capture mode", and an operation mode for maintaining the once established synchronization unless receiving errors are continuously caused is referred to as a "synchronization protection mode". Detailed operations of the respective modes are described later.

Figure 5:
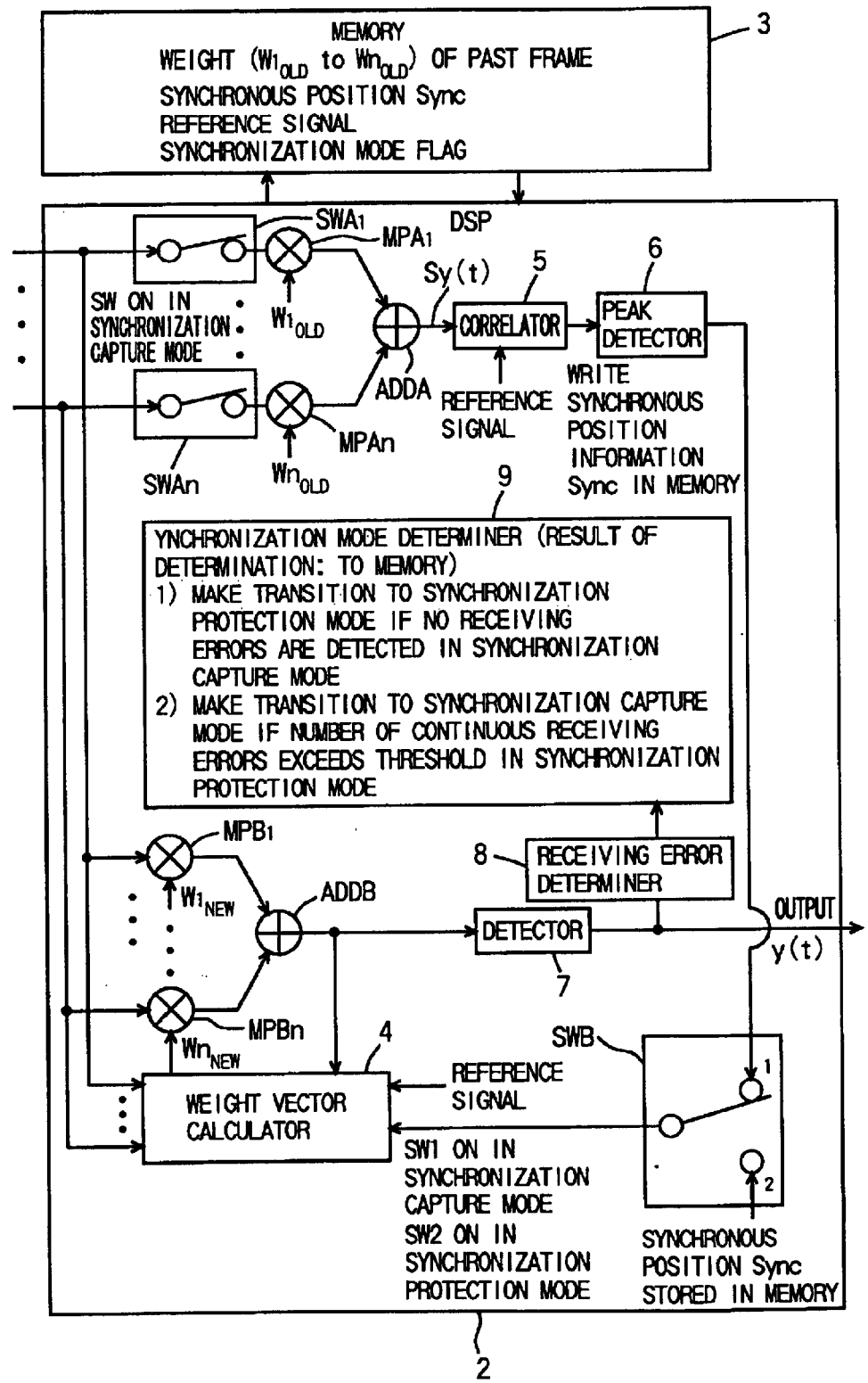
FIG. 5 is a functional block diagram for functionally illustrating processing of a DSP according to a second embodiment of the present invention.

FIG. 5 is a functional block diagram for functionally illustrating processing of a DSP 2 according to the second embodiment of the present invention. This block diagram expresses the DSP 2 as a combination of various circuit elements for illustrating the principle of operations implemented by the DSP similarly to FIG. 2, and the DSP 2 implements processing along flow charts shown in FIGS. 6 and 7 by software in practice.

The operation principle of the second embodiment of the present invention is described with reference to FIG. 5.

In the synchronization capture mode not yet detecting the synchronous position, switches $SWA_1, \ldots, SWA_n$ are turned on so that a first adaptive array synthesizes received signals $x1(t), \ldots, xn(t)$ and weight vector $W_{1OLD}, W_{2OLD}, \ldots, w_{nOLD}$ of precedent frame stored in a memory 3 and a signal Sy(t) subjected to removal of an interference wave component is extracted and supplied to a correlator 5, similarly to the aforementioned first embodiment.

The correlator 5 calculates the correlation function of the signal Sy(t) and a reference signal stored in the memory 3, and supplies the correlation function to a peak detector 6.

The peak detector 6 detects a time position where the correlation function calculated in the correlator 5 peaks as a synchronous position Sync, and supplies the synchronous position Sync to a weight vector calculator 4 through a switch SWB turned on toward a fixed end $SW_1$ while storing the same in the memory 3 in the synchronization capture mode.

The weight vector calculator 4 regards the detected synchronous position Sync as the start position (SS) of frame of the received signals, and starts calculating weight vector $w_{1NEW}, w_{2NEW}, \ldots, W_{nNEW}$.

A second adaptive array synthesizes the weight vectors $w_{1NEW}, W_{2NEW}, \ldots, W_{nNEW}$ calculated in this manner with the received signals $x1(t), \ldots, xn(t)$, so that a signal from a desired PS is extracted and output as an output signal y(t) through a detector 7.

The output signal y(t) from the detector 7 is on one hand supplied to a receiving error determiner 8, which determines presence/absence of receiving errors.

The result of determination of the receiving error determiner 8 is supplied to a synchronization mode determiner 9. When the receiving error determiner 8 determines that there are no receiving errors in the synchronization capture mode, the synchronization mode determiner 9 decides transition from the synchronization capture mode to the synchronization protection mode (arrow ② in FIG. 4), and stores a synchronization mode flag indicating the result in the memory 3. When the receiving error determiner 8 determines that there are receiving errors, on the other hand, the synchronization capture mode is maintained (arrow ① in FIG. 4), and the aforementioned operations are repeated until the receiving error determiner 8 determines that there are no receiving errors.

When entering the synchronization protection mode, the switches $SWA_1, \ldots, SWA_n$ are turned off to perform no synchronization preprocessing employing weight vector of the precedent frame. Substitutionally, a fixed end SW2 of the switch SWB is turned on so that the synchronous position Sync detected in the synchronization capture mode and stored in the memory 3 is supplied to the weight vector calculator 4 as the start position (SS) of the frame of the received signals. Thereafter the weight vector calculator 4 calculates weight vector on the basis of the fixed synchronous position Sync stored in the memory 3 in the synchronization protection mode. This is an operation based on the premise that the synchronous position does not fluctuate at a high speed every frame of a 5 millisecond unit.

When receiving errors are detected in the output signal y(t) obtained by the weight vector calculation based on the fixed synchronous position Sync, the synchronization mode determiner 9 maintains the synchronization protection mode unless the number of continuously caused receiving errors exceeds a threshold (arrow ③ in FIG. 4).

When the synchronization mode determiner 9 determines that the number of continuously caused receiving errors exceeds the threshold, however, the synchronization mode determiner 9 decides transition from the synchronization protection mode to the synchronization capture mode (arrow ④ in FIG. 4), and stores a synchronization mode flag indicating the result in the memory 3.

Returning to the synchronization capture mode, the aforementioned synchronization preprocessing employing the first adaptive array and the weight vector of the precedent frame is executed for detecting the synchronous position by correlation synchronization again.

Figure 6:
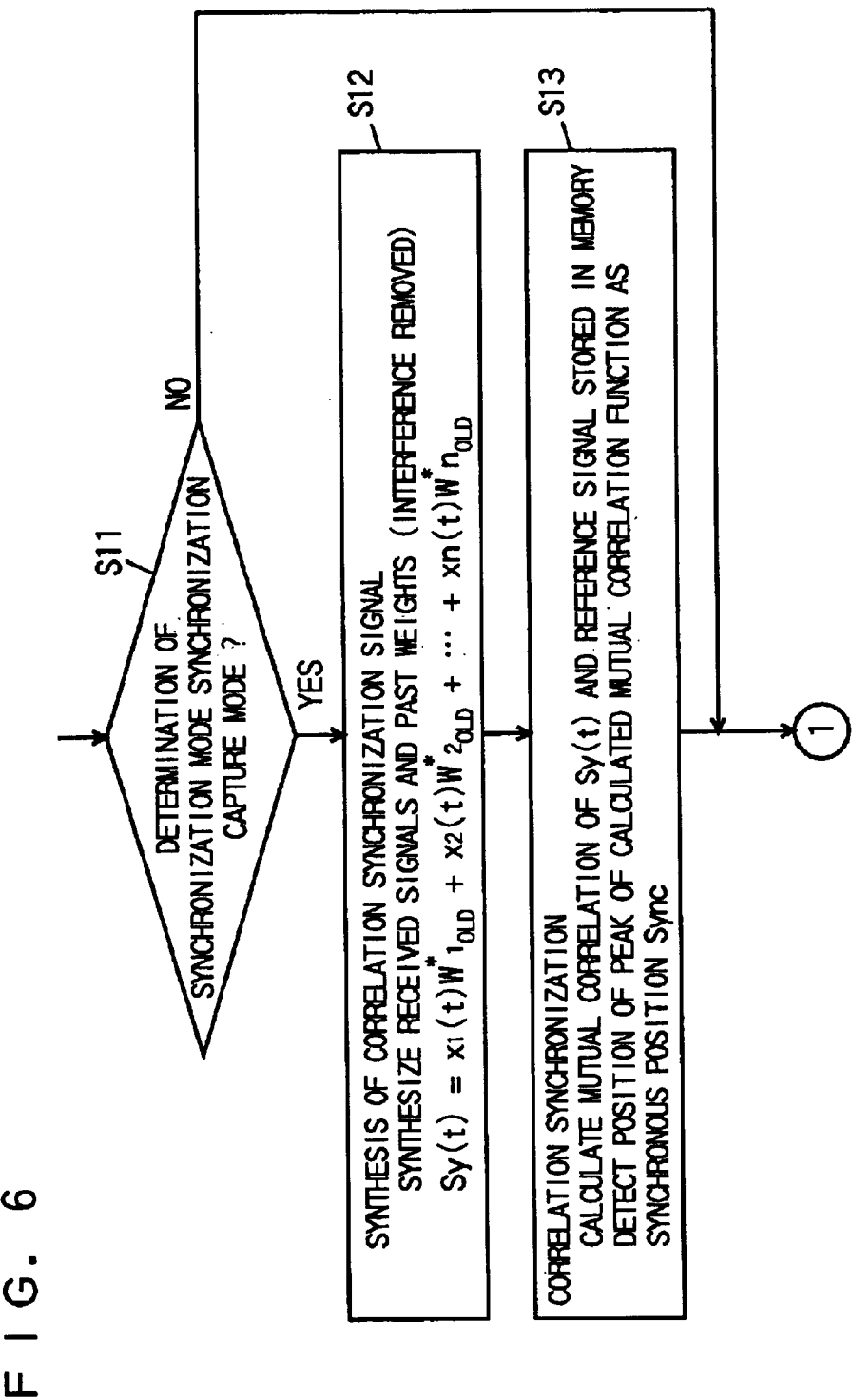
FIG. 6 is a flow chart showing the first half of processing of the DSP executing the operations of the functional block diagram shown in FIG. 5 by software.
Figure 7:
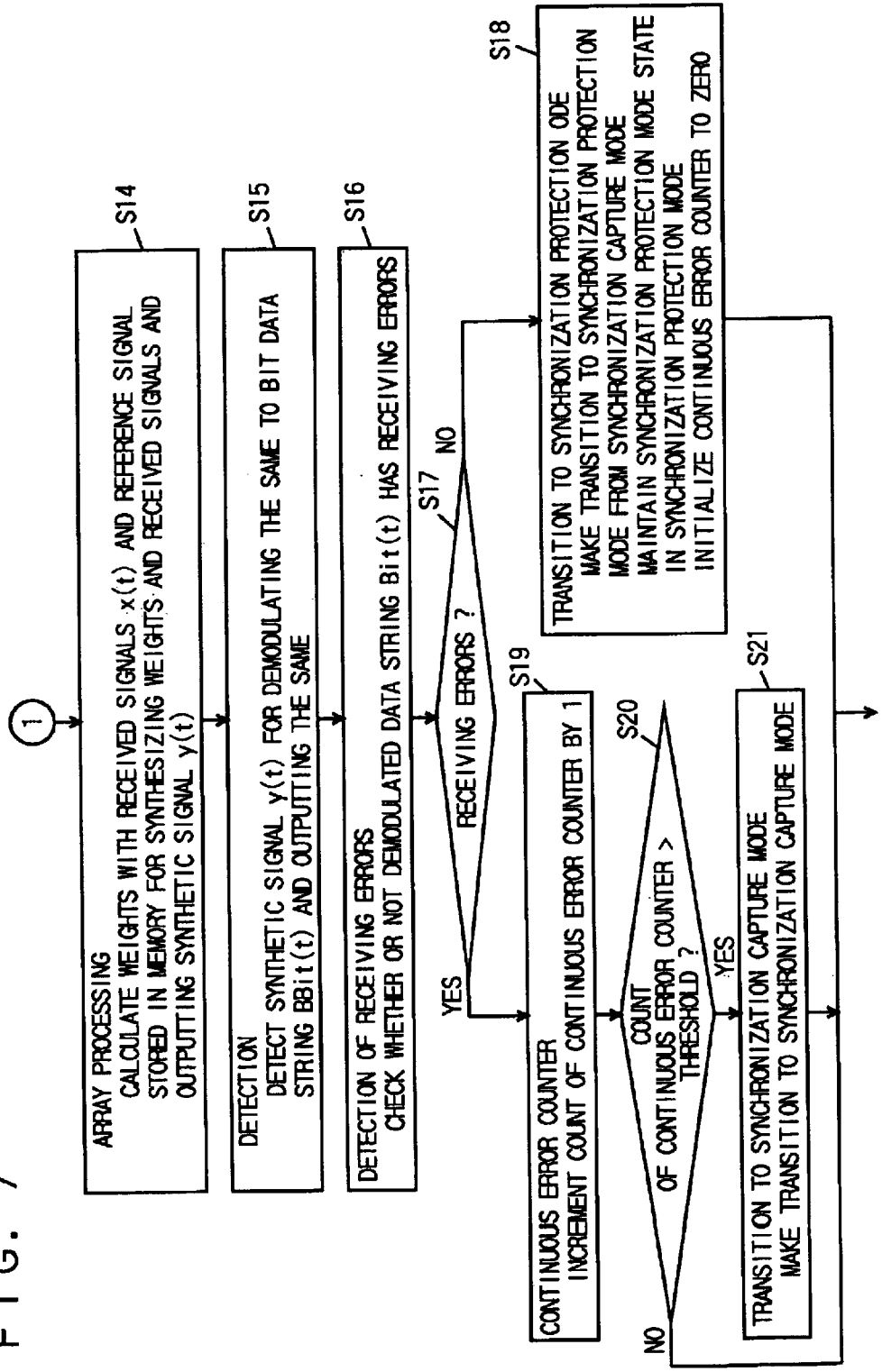
FIG. 7 is a flow chart showing the rear half of the processing of the DSP executing the operations of the functional block diagram shown in FIG. 5 by software.

FIGS. 6 and 7 are flow charts showing the operations of the functional block diagram shown in FIG. 5 executed by the DSP 2 by software as a whole.

At a step S11, synchronization mode determination is executed for determining whether the DSP 2 is in the synchronization capture mode or in the synchronization protection mode at present.

When the DSP 2 is determined as in the synchronization capture mode at present at the step S11, synchronization preprocessing and calculation of weight vector as well as extraction of the signal y(t) from a desired PS are executed at steps S12 to 14. The processing at these steps S12 to S14 is absolutely identical to the processing at the steps S1 to S3 in the first embodiment shown in FIG. 3, and hence redundant description is not repeated.

When the signal y(t) is extracted at the step S14, the signal y(t) is detected by an operation corresponding to that of the detector 7 shown in FIG. 5 at a step S15, and it is determined whether or not the aforementioned detected demodulated output has receiving errors at a step S16 by an operation corresponding to that of the receiving error determiner 8 shown in FIG. 5.

When it is determined that there are no receiving errors at a step S17, transition from the synchronization capture mode to the synchronization protection mode is executed at a step S18 (arrow ② in FIG. 4).

When it is determined that there are receiving errors at the step S17, on the other hand, the number of continuous errors is counted at a step S19, so that the synchronization capture mode is maintained as such (arrow ① in FIG. 4) even if the count is 1 (step S20).

When the synchronization protection mode is determined at the step S11, on the other hand, the synchronization preprocessing and the detection of the synchronous position by correlation synchronization at the steps S12 and S13 are skipped for immediately executing array processing at the step S14. At the step S14, calculation of weight vector is executed with the synchronous position Sync detected in the precedent synchronization capture mode stored in the memory 3 as a start position (SS).

When it is determined that the demodulated output has no receiving errors through the steps S15 to S17, the synchronization protection mode is maintained at a step S18 (arrow ③ in FIG. 4).

When it is determined that there are receiving errors at the step S17, on the other hand, continuous errors are counted at a step S19 so that transition from the synchronization protection mode to the synchronization capture mode is executed at a step S21 if the count exceeds the threshold value at a step S20 (arrow ④ in FIG. 4). When it is determined that there are no errors at least once at the step S17 while counting continuous errors, a continuous error counter is initialized to zero at the step S18.

Thereafter these steps S11 to S21 are repeated for making transition between the synchronization capture mode and the synchronization protection mode and updating the synchronous position Sync in the synchronization capture mode.

Handling in the case where weight vector is not yet calculated in the first frame of the received signals is as described with reference to the first embodiment.

[Third Embodiment]

Figure 8:
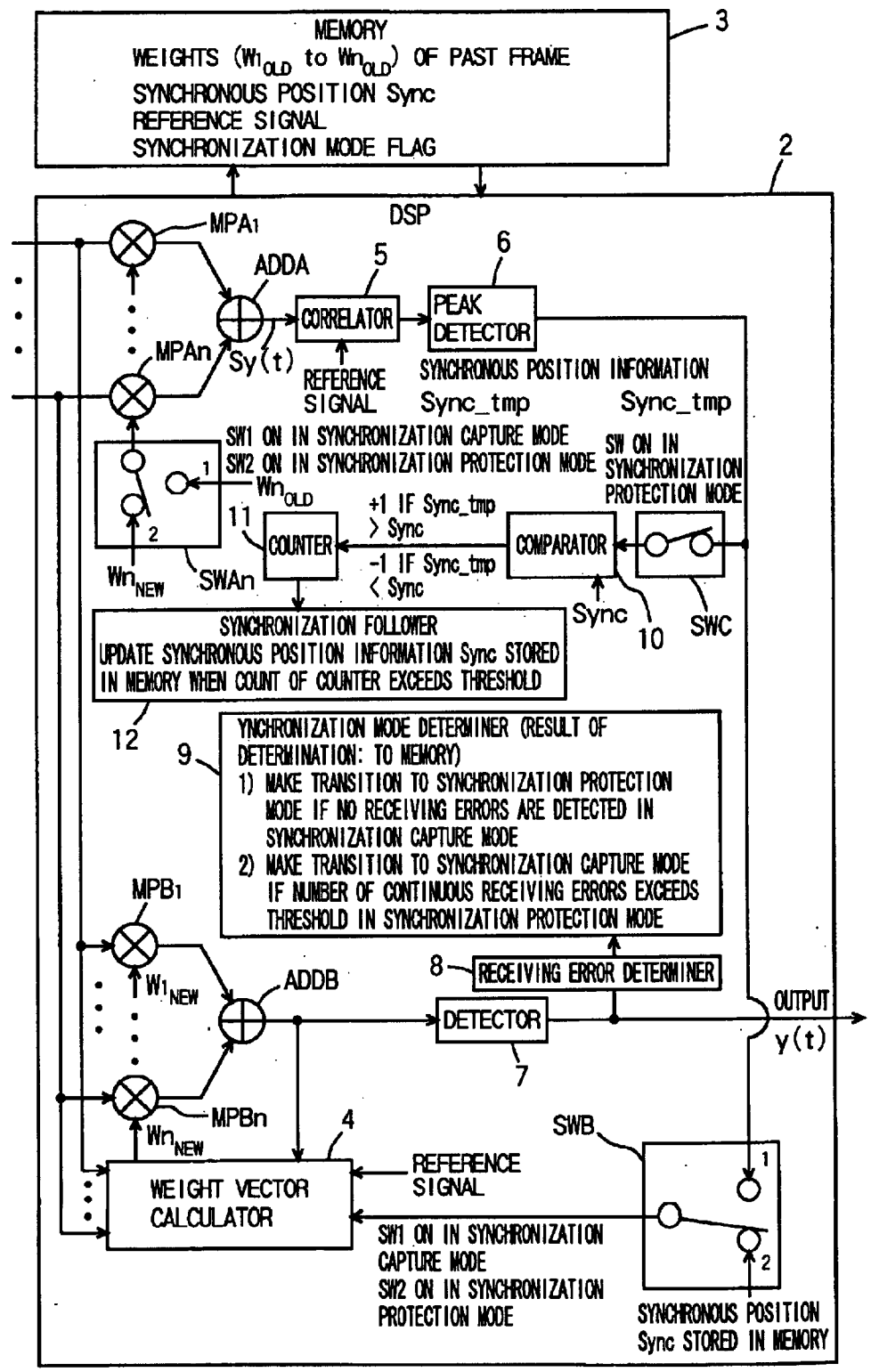
FIG. 8 is a functional block diagram for functionally illustrating processing of a DSP according to a third embodiment of the present invention.

FIG. 8 is a functional block diagram for functionally illustrating processing of a DSP 2 according to the third embodiment of the present invention. This block diagram expresses the DSP 2 as a combination of various circuit elements for illustrating the principle of operations implemented by the DSP 2 similarly to FIGS. 2 and 5, and the DSP 2 implements processing along flow charts shown in FIGS. 9 and 10 by software in practice.

The operation principle of the third embodiment of the present invention is described with reference to FIG. 8.

In a synchronization capture mode not yet detecting a synchronous position, all switches $SWA_1$ (not shown), . . . , $SWAN_n$ are turned on toward fixed ends $SW_1$, and a first adaptive array synthesizes received signals $x1(t), \ldots, xn(t)$ with weight vector $w_{1OLD}, w_{2OLD}, \ldots, w_{nOLD}$ of the precedent frame stored in a memory 3 so that a signal Sy(t) subjected to removal of an interference wave component is extracted and supplied to a correlator 5 (synchronization preprocessing).

The correlator 5 calculates the correlation function of the signal Sy(t) and a reference signal stored in the memory 3, and supplies the correlation function to a peak detector 6.

The peak detector 6 detects a time position where the correlation function calculated in the correlator 5 peaks as a synchronous position Sync, and supplies the synchronous position Sync to a weight vector calculator 4 through a switch SWB turned on toward a fixed end SW1 while storing the same in the memory 3 in the synchronization capture mode.

The weight vector calculator 4 regards the detected synchronous position Sync as the start position (SS) of the frame of the received signals and starts calculating weight vector $w_{1NEW}, w_{2NEW}, \ldots, w_{nNEW}$.

A second adaptive array synthesizes the weight vector $w_{1NEW}, w_{2NEW}, \ldots, w_{nNEW}$ calculated in this manner with the received signals $x1(t), \ldots, xn(t)$, so that a signal from a desired PS is extracted and output as an output signal y(t) through a detector 7.

The output signal y(t) from the detector 7 is supplied to a receiving error determiner 8 on one hand, so that presence/absence of receiving errors is determined.

The result of the determination of the receiving error determiner 8 is supplied to a synchronization mode determiner 9. When the receiving error determiner 8 determines that there are no receiving errors in the synchronization capture mode, the synchronization mode determiner 9 decides transition from the synchronization capture mode to a synchronization protection mode (arrow ② in FIG. 4), and stores a synchronization mode flag indicating the result in the memory 3. When the receiving error determiner 8 determines that there are receiving errors, on the other hand, the synchronization capture mode is maintained (arrow ① in FIG. 4) and the aforementioned operations are repeated until it is determined that there are no receiving errors.

Entering the synchronization protection mode, the switch SWB is turned on toward a fixed end SW2, so that the synchronous position Sync detected in the synchronization capture mode and stored in the memory 3 is supplied to the weight vector calculator 4 as the start position of the frame of the received signals. Thereafter the weight vector calculator 4 calculates a weight vector on the basis of the synchronous position Sync stored in the memory 3.

When receiving errors are detected in the output signal y(t) obtained by the weight vector calculation based on the synchronous position Sync stored in the memory 3, the synchronization protection mode is maintained unless the number of continuously caused receiving errors exceeds a threshold (arrow ③ in FIG. 4).

When the synchronization mode determiner 9 determines that the number of continuously caused receiving errors exceeds the threshold, however, the synchronization mode determiner 9 decides transition from the synchronization protection mode to the synchronization capture mode (arrow ④ in FIG. 4), and stores a synchronization mode flag indicating the result in the memory 3.

Returning to the synchronization capture mode, the aforementioned synchronization preprocessing employing the first adaptive array and the weight vector of the precedent frame is executed for detecting the synchronous position again.

While the aforementioned operations are basically identical to the operations of the second embodiment shown in FIG. 5, the third embodiment shown in FIG. 8 modifies the operations of the second embodiment 2 in the following point:

While the synchronous position Sync stored in the memory 3 remains fixed during the synchronization protection mode period in the second embodiment, the synchronous position Sync stored in the memory 3 is finely controlled in the third embodiment also in the synchronization protection mode period, as described below.

When entering the synchronization protection mode from the synchronization capture mode, all switches $SWA_1$ (not shown), . . . , $SWA_n$ are turned on toward fixed ends SW2, so that the first adaptive array synthesizes the received signals $x1(t), \ldots, xn(t)$ with the weight vector $w_{1NEW}, w_{2NEW}, \ldots, w_{nNEW}$ of the current received signals calculated by the weight vector calculator 4 and the signal Sy(t) subjected to removal of an interference wave component is extracted and supplied to the correlator 5.

The correlator 5 calculates the correlation function of the signal Sy(t) and the reference signal stored in the memory 3 and supplies the correlation function to the peak detector 6.

The peak detector 6 detects a time position where the correlation function calculated in the calculator 5 peaks as synchronous position information Sync_tmp, which in turn is supplied to a first input of a comparator 10 through a switch SWC turned on in the synchronization protection mode. The synchronous position Sync stored in the memory 3 is input in a second input of the comparator 10.

The comparator 10 increments the count of a counter 11 by 1 when the synchronous position information Sync_tmp is greater than the synchronous position Sync (Sync_tmp>Sync), and decrements the count by 1 when the synchronous position information Sync_tmp is less than the synchronous position Sync (Sync_tmp<Sync).

The count of the counter 11 is supplied to a synchronization follower 12, so that the synchronous position Sync stored in the memory 3 is updated in a positive direction when the count of the counter 11 positively increases to exceed a first threshold while the synchronous position Sync stored in the memory 3 is updated in a negative direction when the count negatively reduces below a second threshold.

Thus, the received signals can be demodulated in higher precision by finely controlling the synchronous position information stored in the memory in a direction where the synchronous position deviates in consideration of that the actual synchronous position can finely fluctuate also in the synchronization protection mode period.

Figure 9:
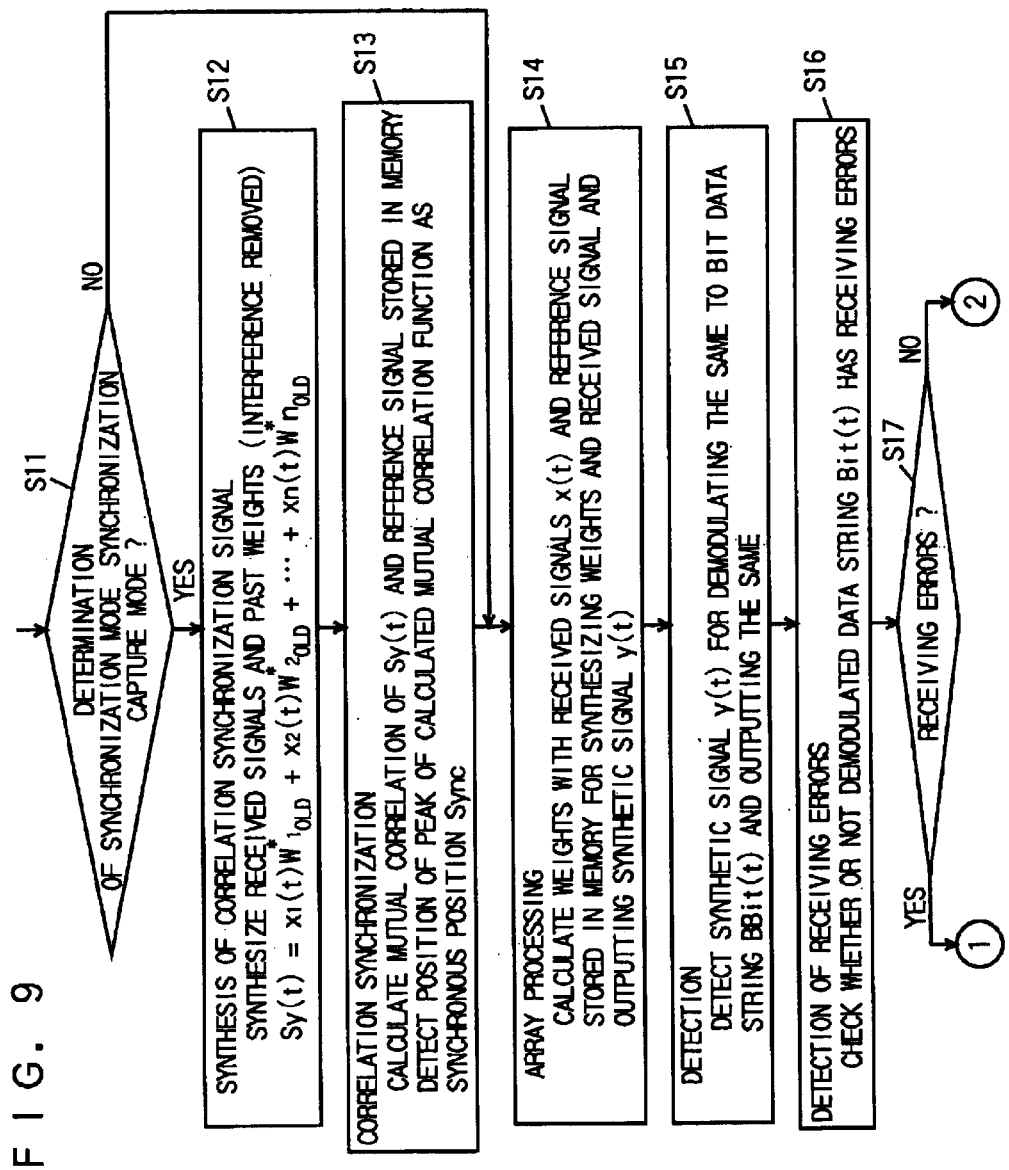
FIG. 9 is a flow chart showing the first half of processing of the DSP executing the operations of the functional block diagram shown in FIG. 8 by software.
Figure 10:
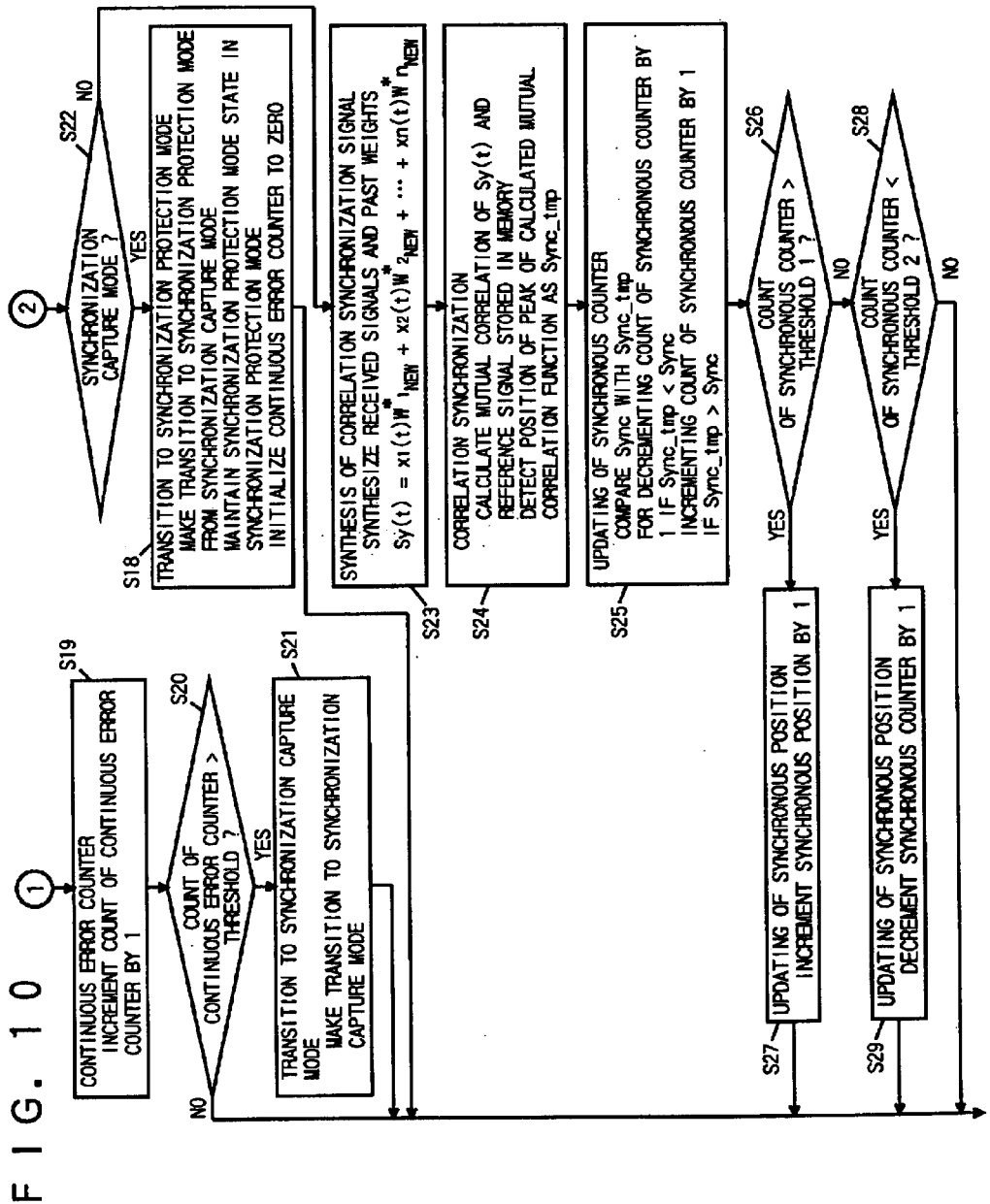
FIG. 10 is a flow chart showing the rear half of the processing of the DSP executing the operations of the functional block diagram shown in FIG. 8 by software.

FIGS. 9 and 10 are flow charts showing processing of the DSP 2 implementing the operations of the functional block diagram shown in FIG. 8 by software as a whole.

In the flow charts shown in FIGS. 9 and 10, processing at steps S11 to S21 is absolutely identical to the processing at the steps S11 to S21 of the second embodiment shown in FIGS. 6 and 7, and hence redundant description is not repeated.

In the flow charts shown in FIGS. 9 and 10, steps S22 to S29 show processing specific to the third embodiment.

When it is determined that the DSP 2 is in the synchronization protection mode at the step S22, the correlation function is calculated at the step S23 by an operation corresponding to that of the correlator 5 shown in FIG. 8.

Then, the time position where the correlation function peaks is detected as the synchronous position information Sync_tmp by an operation corresponding to that of the peak detector 6 shown in FIG. 8.

At the step S25, the synchronous position Sync stored in the memory 3 is compared with the aforementioned synchronous position information Sync_tmp, for decrementing the count of the counter by 1 if the synchronous position information Sync_tmp is less than the synchronous position Sync (Sync_tmp<Sync), while incrementing the count of the counter by 1 if the synchronous position information Sync_tmp is greater than the synchronous position Sync (Sync_tmp>Sync).

When the count positively increases to exceed the first threshold at the step S26 as a result of repeating updating of the count at the step S25, the synchronous position Sync stored in the memory is updated by +1 at the step S27. When the count negatively reduces below the second threshold at the step S28 to the contrary, the synchronous position Sync stored in the memory is updated by −1 at the step S29.

Thereafter these steps S11 to S29 are repeated for making transition between the synchronization capture mode and the synchronization protection mode and updating the synchronous position Sync also in the synchronization protection mode period in addition to the synchronization capture mode.

Handling in the case where a weight vector is not yet calculated in the first frames of the received signals is as described with reference to the first embodiment.

The embodiments disclosed this time must be considered illustrative in all points and not restrictive. The scope of the present invention is shown not by the above description but by the scope of claim for patent, and it is intended that all modifications within the meaning and the range equivalent to the scope of claim for patent are included.

According to the present invention, as hereinabove described, the synchronous position is specified by the method of correlation synchronization after removing the interference wave component by synchronization preprocessing even when signals of the same frequency are received in the CS in an overlapping manner, whereby the synchronous position of a signal received from a desired PS can be correctly detected to be subjected to precise demodulation.

INDUSTRIAL APPLICABILITY

As hereinabove described, the radio receiving system and the synchronization detection method according to the present invention are suitable for detecting the synchronous position of a signal received from a mobile terminal unit in a base station of a mobile communication system of the PDMA system, for example.

What is claimed is:

1. A radio receiving system (1) receiving a signal from a mobile terminal unit with a plurality of antennas ($ANT_1, \ldots, ANT_n$), comprising:

first interference removal means ($MPA_1, \ldots, MPA_n$, ADDA, 4) provisionally removing an interference signal component from received said signal;

correlation synchronization detection means (5, 6) detecting correlation synchronization of said received signal subjected to removal of the interference signal component by said first interference removal means; and second interference removal means ($MPB_1, \ldots, MPB_n$, ADDB, 4) removing an interference signal component from said received signal with a synchronous position detected by said correlation synchronization detection means as a start position.

2. A radio receiving system (1) receiving a signal from a mobile terminal unit with a plurality of antennas ($ANT_1, \ldots, ANT_n$), comprising:

weight vector calculation means (4) calculating a weight vector corresponding to a desired mobile terminal unit every frame of received said signal;

storage means (3) storing said calculated weight vector;

first signal extraction means ($MPA_1, \ldots, MPA_n$, ADDA) applying said weight vector of a precedent frame stored in said storage means to a frame of newly received said signal and extracting a signal from said desired mobile terminal unit;

correlation function calculation means (5) calculating a correlation function of said extracted signal and a prescribed reference signal;

synchronous position detection means (6) detecting a time position where said correlation function peaks as a synchronous position; and second signal extraction means ($MPB_1, \ldots, MPB_n$, ADDB) applying the weight vector of the frame of said newly received signal calculated by said weight vector calculation means to the frame of said newly received signal for extracting and outputting the signal from said desired mobile terminal unit, wherein said weight vector calculation means calculates the weight vector of the frame of said newly received signal with said detected synchronous position as a start position.

3. A radio receiving system (1) receiving a signal from a mobile terminal unit with a plurality of antennas ($ANT_1, \ldots, ANT_n$), comprising:

weight vector calculation means (4) calculating a weight vector corresponding to a desired mobile terminal unit every frame of received said signal;

first storage means (3) storing said calculated weight vector;

mode set means (9) setting a synchronization capture mode or a synchronization protection mode;

first signal extraction means ($MPA_1, \ldots, MPA_n$, ADDA) applying said weight vector of a precedent frame stored in said first storage means to a frame of newly received said signal and extracting a signal from said desired mobile terminal unit in said synchronization capture mode;

correlation function calculation means (5) calculating a correlation function of the signal extracted by said first signal extraction means and a prescribed reference signal in said synchronization capture mode;

synchronous position detection means (6) detecting a time position where said correlation function peaks as a synchronous position in said synchronization capture mode;

second storage means (3) storing said detected synchronous position;

second signal extraction means ($MPB_1, \ldots, MPB_n$, ADDB) applying the weight vector of the frame of said newly received signal calculated by said weight vector calculation means to the frame of said newly received signal for extracting and outputting the signal from said desired mobile terminal unit; and error determination means (8) determining whether or not the signal extracted by said second signal extraction means has a receiving error, wherein said weight vector calculation means calculates the weight vector of the frame of said newly received signal with the synchronous position detected by said synchronous position detection means as a start position in said synchronization capture mode or with the synchronous position stored in said second storage means as a start position in said synchronization protection mode, and said mode set means sets said synchronization protection mode when said error determination means determines that there is no error in said synchronization capture mode while maintaining said synchronization capture mode when said error determination means determines that there is an error in said synchronization capture mode and sets said synchronization capture mode when said error determination means continuously determines that there is an error in excess of a prescribed number of times in said synchronization protection mode while maintaining said synchronization protection mode when said prescribed number of times is not reached in said synchronization protection mode.

4. A radio receiving system (1) receiving a signal from a mobile terminal unit with a plurality of antennas ($ANT_1, \ldots ANT_n$), comprising:

weight vector calculation means (4) calculating a weight vector corresponding to a desired mobile terminal unit every frame of received said signal;

first storage means (3) storing said calculated weight vector;

mode set means (9) setting a synchronization capture mode or a synchronization protection mode;

first signal extraction means ($MPA_1, \ldots, MPA_n$, ADDA) applying said weight vector of a precedent frame stored in said first storage means in said synchronization capture mode or the weight vector of the frame of newly received said signal calculated by said weight vector calculation means in said synchronization protection mode to the frame of said newly received signal and extracting a signal from said desired mobile terminal unit;

correlation function calculation means (5) calculating a correlation function of the signal extracted by said first signal extraction means and a prescribed reference signal;

synchronous position detection means (6) detecting a time position where said correlation function peaks as a synchronous position;

second storage means (3) storing said detected synchronous position;

second signal extraction means ($MPB_1, \ldots, MPB_n$, ADDB) applying the weight vector of the frame of said newly received signal calculated by said weight vector calculation means to the frame of said newly received signal for extracting and outputting the signal from said desired mobile terminal unit; and error determination means (8) determining whether or not the signal extracted by said second signal extraction means has a receiving error, wherein said weight vector calculation means calculates the weight vector of the frame of said newly received signal with the synchronous position detected by said synchronous position detection means as a start position in said synchronization capture mode or with the synchronous position stored in said second storage means as a start position in said synchronization protection mode, and said mode set means sets said synchronization protection mode when said error determination means determines that there is no error in said synchronization capture mode while maintaining said synchronization capture mode when said error determination means determines that there is an error in said synchronization capture mode and sets said synchronization capture mode when said error determination means continuously determines that there is an error in excess of a prescribed number of times in said synchronization protection mode while maintaining said synchronization protection mode when said prescribed number of times is not reached in said synchronization protection mode, said radio receiving system further comprising means (12) comparing the synchronous position detected by said synchronous position detection means with the synchronous position stored in said second storage means in said synchronization protection mode for updating the synchronous position stored in said second storage means when the difference between the synchronous positions exceeds a prescribed magnitude.

5. A synchronization detection method in a radio receiving system (1) receiving a signal from a mobile terminal unit with a plurality of antennas ($ANT_1, \ldots, ANT_n$), comprising steps of:

provisionally an interference signal component from received said signal;

detecting correlation synchronization of said received signal subjected to removal of the interference signal component; and removing an interference signal component from said received signal with the synchronous position detected by said correlation synchronization detection as a start position.

6. A synchronization detection method in a radio receiving system (1) receiving a signal from a mobile terminal unit with a plurality of antennas ($ANT_1, \ldots, ANT_n$), comprising steps of:

calculating a weight vector corresponding to a desired mobile terminal unit every frame of received said signal;

storing said calculated weight vector;

applying said stored weight vector of a precedent frame to a frame of newly received said signal and extracting a signal from said desired mobile terminal unit;

calculating a correlation function of said extracted signal and a prescribed reference signal;

detecting a time position where said correlation function peaks as a synchronous position; and applying the calculated weight vector of the frame of said newly received signal to the frame of said newly received signal for extracting and outputting the signal from said desired mobile terminal unit, wherein said step of calculating said weight vector performs calculation of the weight vector of the frame of said newly received signal with said detected synchronous position as a start position.

7. A synchronization detection method in a radio receiving system (1) receiving a signal from a mobile terminal unit with a plurality of antennas ($ANT_1, \ldots, ANT_n$), comprising steps of:

calculating a weight vector corresponding to a desired mobile terminal unit every frame of received said signal;

storing said calculated weight vector;

setting a synchronization capture mode or a synchronization protection mode;

applying said stored weight vector of a precedent frame to a frame of newly received said signal and extracting a signal from said desired mobile terminal unit in said synchronization capture mode;

calculating a correlation function of said extracted signal and a prescribed reference signal in said synchronization capture mode;

detecting a time position where said correlation function peaks as a synchronous position in said synchronization capture mode;

storing said detected synchronous position;

applying the calculated weight vector of the frame of said newly received signal to the frame of said newly received signal for extracting and outputting the signal from said desired mobile terminal unit; and determining whether or not said extracted signal has a receiving error, wherein said step of calculating said weight vector performs calculation of the weight vector of the frame of said newly received signal with said detected synchronous position as a start position in said synchronization capture mode or with said stored synchronous position as a start position in said synchronization protection mode, and said step of setting said mode sets said synchronization protection mode when it is determined that there is no error in said synchronization capture mode while maintaining said synchronization capture mode when it is determined that there is an error in said capture mode and sets said synchronization capture mode when it is continuously determined that there is an error in excess of a prescribed number of times in said synchronization protection mode while maintaining said synchronization protection mode when said prescribed number of times is not reached in said synchronization protection mode.

8. A synchronization detection method in a radio receiving system (1) receiving a signal from a mobile terminal unit with a plurality of antennas ($ANT_1, \ldots ANT_n$), comprising steps of:

calculating a weight vector corresponding to a desired mobile terminal unit every frame of received said signal;

storing said calculated weight vector;

setting a synchronization capture mode or a synchronization protection mode;

applying said stored weight vector of a precedent frame in said synchronization capture mode or said calculated weight vector of the frame of newly received said signal in said synchronization protection mode to the frame of said newly said signal and extracting a signal from said desired mobile terminal unit;

calculating a correlation function of said extracted signal and a prescribed reference signal;

detecting a time position where said correlation function peaks as a synchronous position;

storing said detected synchronous position;

applying the calculated weight vector of the frame of said newly received signal to the frame of said newly received signal for extracting and outputting the signal from said desired mobile terminal unit; and determining whether or not said extracted signal has a receiving error, wherein said step of calculating said weight vector performs calculation of the weight vector of the frame of said newly received signal with said detected synchronous position as a start position in said synchronization capture mode or with said stored synchronous position as a start position in said synchronization protection mode, and said step of setting said mode sets said synchronization protection mode when it is determined that there is no error in said synchronization capture mode while maintaining said synchronization capture mode when it is determined that there is an error in said synchronization capture mode and sets said synchronization capture mode when it is continuously determined that there is an error in excess of a prescribed number of times in said synchronization protection mode while maintaining said synchronization protection mode when said prescribed number of times is not reached in said synchronization protection mode, said synchronization detection method further comprising a step of comparing said detected synchronous position with said stored synchronous position in said synchronization protection mode for updating said stored synchronous position when the difference between the synchronous positions exceeds a prescribed magnitude.

* * * * *